(12) United States Patent
Lowder et al.

(10) Patent No.: US 12,440,455 B2
(45) Date of Patent: Oct. 14, 2025

(54) METHODS OF ADMINISTERING CANNABINOIDS

(71) Applicant: IMPACT NATURALS, INC., San Diego, CA (US)

(72) Inventors: James Lowder, San Diego, CA (US); Ramon Seva, San Diego, CA (US); Vassili Kotlov, San Diego, CA (US)

(73) Assignee: IMPACT NATURALS, INC., San Diego, CA (US)

( * ) Notice: Subject to any disclaimer, the term of this patent is extended or adjusted under 35 U.S.C. 154(b) by 0 days.

(21) Appl. No.: 18/169,155

(22) Filed: Feb. 14, 2023

(65) Prior Publication Data

US 2023/0255901 A1 Aug. 17, 2023

Related U.S. Application Data

(60) Provisional application No. 63/309,929, filed on Feb. 14, 2022.

(51) Int. Cl.
| | | |
|---|---|---|
| *A61K 31/05* | (2006.01) | |
| *A61K 31/352* | (2006.01) | |
| *A61K 47/54* | (2017.01) | |

(52) U.S. Cl.
CPC ............ *A61K 31/05* (2013.01); *A61K 31/352* (2013.01); *A61K 47/543* (2017.08)

(58) Field of Classification Search
CPC ..... A61K 31/05; A61K 31/352; A61K 47/543
See application file for complete search history.

(56) References Cited

U.S. PATENT DOCUMENTS

| | | |
|---|---|---|
| 10,756,180 B2 | 8/2020 | Reillo et al. |
| 2014/0357708 A1 * | 12/2014 | Murty ............... A61K 47/10 514/454 |
| 2019/0298683 A1 | 10/2019 | Friedman |
| 2020/0246404 A1 | 8/2020 | Yucel et al. |
| 2021/0069103 A1 | 3/2021 | Le Devedec et al. |

FOREIGN PATENT DOCUMENTS

| | | | | |
|---|---|---|---|---|
| WO | WO-2015025312 A1 * | 2/2015 | ........... | A61K 31/047 |
| WO | WO 2016/022936 | 2/2016 | | |
| WO | WO-2018152334 A1 * | 8/2018 | ............... | A23L 2/52 |
| WO | WO 2020/212976 | 10/2020 | | |

OTHER PUBLICATIONS

Stella et al. Cannabinoid Formulations and Delivery Systems: Current and Future Options to Treat Pain, (Drugs, 81: 1513-1557). (Year: 2021).*
Leyva-Gutierrez et al. Characterization of By-Products from Commercial Cannabidiol Production (Journal of Agricultural and Food Chemistry, 68, 7648-7659) (Year: 2020).*
Grijo et al. Supercritical Extraction Strategies Using CO2 and Ethanol to Obtain Cannabinoid Compounds from Cannabis Hybrid Flowers (Journal of CO2 Utilization 30, 241-248). (Year: 2019).*
Gervajio, Fatty Acids and Derivatives from Coconut Oil (Kirk-Othmer Chemical Technology of Cosmetics, p. 445-458). (Year: 2013).*
Caddeo et al. A Neuroendocrine Therapeutic Approach with the Pineal Hormone Melatonin, Cannabidiol, and Oxytocin in the Treatment of the Autism Spectrum disorders (J Immuno Allerg. 1(2): 1-7). (Year: 2020).*
Nguyen, et al., "Cannabidiol inhibits SARS-CoV-2 replication through induction of the host ER stress and innate immune responses", *Sci. Adv.*, 8(8), eabi6110, (2022).
Horst HJ, Höltje WJ, Dennis M, Coert A, Geelen J, Voigt KD. Lymphatic absorption and metabolism of orally administered testosterone undecanoate in man. Klin Wochenschr. Sep. 15, 1976;54(18):875-9. doi: 10.1007/BF01483589. PMID: 966635.
Knaub, et al., "A Novel Self-Emulsifying Drug Delivery System (SEDDS) Based on VESIsorb® Formulation Technology Improving the Oral Bioavailability of Cannabidiol in Healthy Subjects", *Molecules*, 24(16), pp. 2967, (2019).
Shackleford et al. Contribution of lymphatically transported testosterone undecanoate to the systemic exposure of testosterone after oral administration of two andriol formulations in conscious lymph duct-cannulated dogs. J Pharmacol Exp Ther. Sep. 2003;306(3):925-33. doi: 10.1124/jpet.103.052522. Epub Jun. 13, 2003. PMID: 12807999.
Zhang, Zichen et al. "An update on oral drug delivery via intestinal lymphatic transport." *Acta pharmaceutica Sinica. B* vol. 11,8 (2021): 2449-2468. doi:10.1016/j.apsb.2020.12.022.

\* cited by examiner

*Primary Examiner* — Joseph K McKane
*Assistant Examiner* — Meghan C Heasley
(74) *Attorney, Agent, or Firm* — Hoxie & Associates LLC

(57) ABSTRACT

The disclosure provides compositions and methods of treatment by enhanced delivery of cannabinoids using cannabinoid-infused powders comprising a cannabinoid API, an edible carrier, and an edible oil comprising long chain triglycerides.

3 Claims, 1 Drawing Sheet

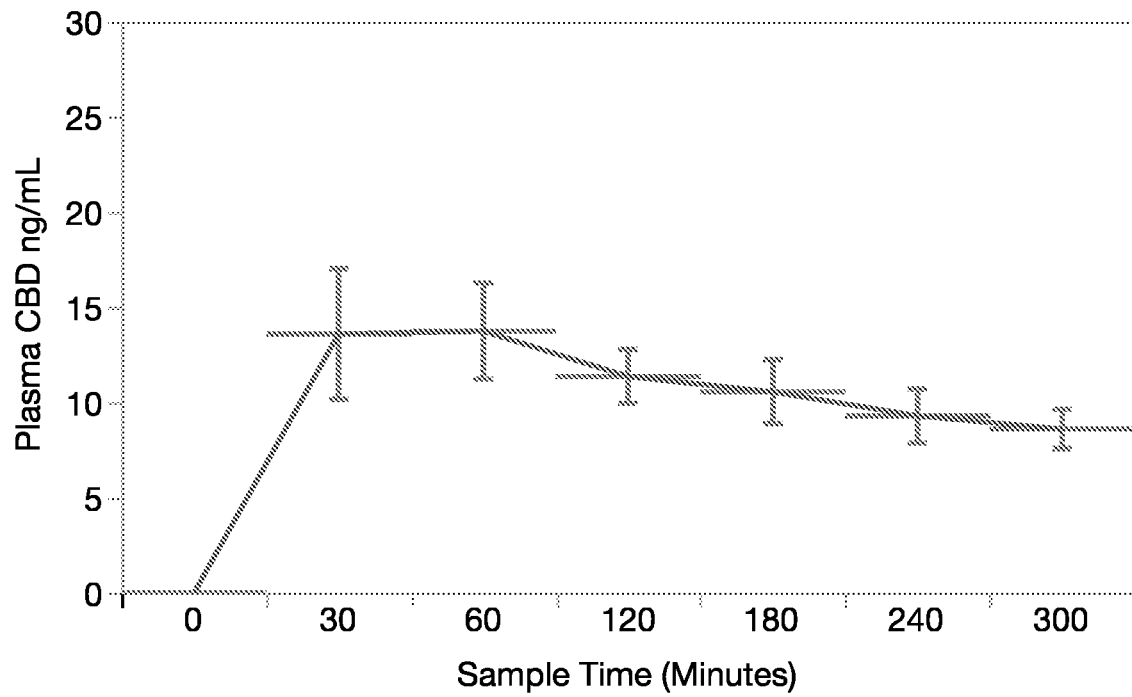
Formulation D
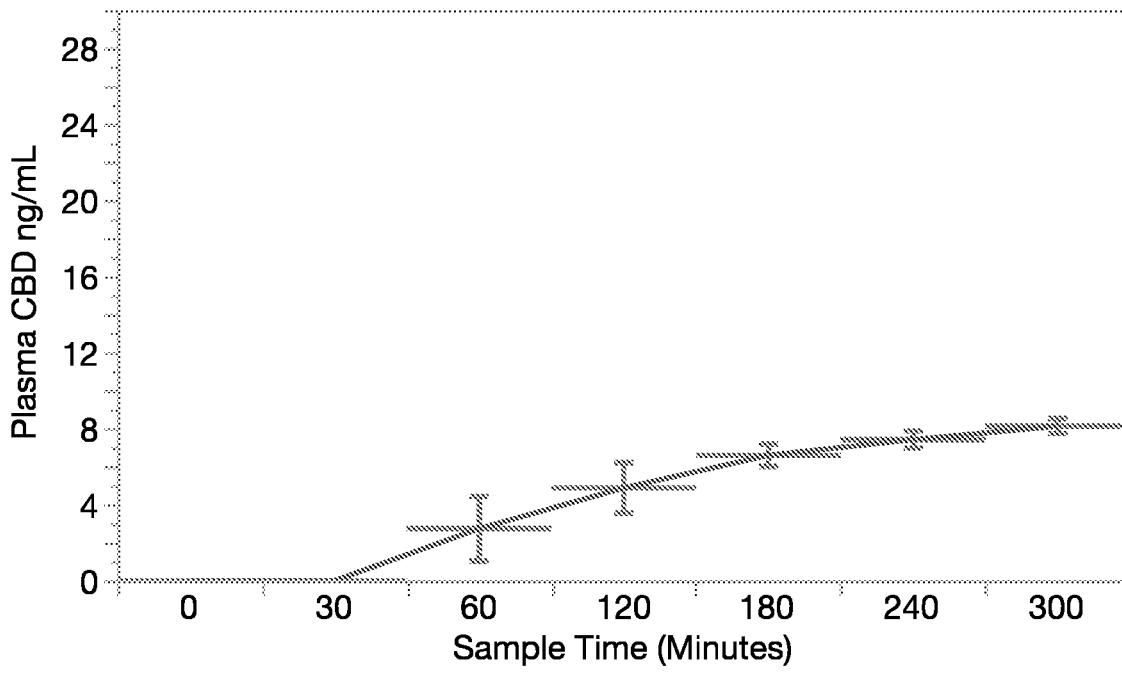
MedTerra

METHODS OF ADMINISTERING CANNABINOIDS

CROSS-REFERENCE

This application claims the benefit of U.S. Provisional Application Ser. No. 63/309,929, filed Feb. 14, 2022.

FIELD

The present invention relates to methods of treatment comprising delivering cannabinoids, e.g., cannabidiol, cannabinol, and/or cannibigerol, via the lymphatic system, thereby providing enhanced bioavailability of the cannabinoid and enhanced delivery of the cannabinoid to the central nervous system, together with formulations for use in these methods.

BACKGROUND

Cannabidiol (CBD) is a naturally occurring cannabinoid in the *Cannabis sativa* plant. Cannabinoids are a class of diverse chemical compounds that act on cannabinoid receptors in cells that alter neurotransmitter release in the brain. There are at least 113 different cannabinoids isolated from *Cannabis*, exhibiting varied effects. Cannabidiol is the second most prevalent active ingredient of *Cannabis* extracts and has been studied for many different uses. It is known that cannabidiol lacks the psychoactive effects seen in many of the other cannabinoids including delta-9-tetrahydrocannabinol (THC). Cannabidiol may have potential as a treatment for a wide range of medical conditions including arthritis, diabetes, alcohol use disorders, multiple sclerosis, chronic pain, schizophrenia, post-traumatic stress disorder (PTSD), depression, rare white matter disorders, antibiotic-resistant infections, epilepsy, inflammation, and other neurological disorders. Cannabidiol is a component of pharmaceutical medications currently used to treat diseases such as multiple sclerosis and epilepsy. For example, an orally administered cannabidiol solution containing sesame oil (Epidiolex®) was approved by the US food and Drug Administration in 2018 as a treatment for two rare forms of childhood epilepsy: Lennox-Gastaut syndrome and Dravet syndrome. A nasal spray (Sativex®) containing both THC and cannabidiol is used for pain and muscle-tightness in people with multiple sclerosis.

Cannabidiol is a non-polar compound and has aqueous solubility of approximately 0.013 milligrams per milliliter. Furthermore, cannabidiol has low oral bioavailability and is inconsistently absorbed through the body's mucous membranes and from the digestive tract into the blood stream. Clinical studies have reported the oral bioavailability of cannabidiol as low as approximately 5-10% and absorption has been reported to fluctuate greatly depending on various factors such as the fat content of meals consumed by the study participants prior to dosing and other factors. Other non-psychoactive cannabinoids found in *Cannabis* include cannabigerol (CBG) and cannabinol (CBN), which have similarly low solubility and bioavailability.

Cannabidiol has been shown to inhibit SARS-CoV-2 replication, and may inhibit other viruses as well. Nguyen, et al., "*Cannabidiol inhibits SARS-CoV-2 replication through induction of the host ER stress and innate immune responses.*" Sci. Adv. 8, eabi6110 (2022). Relatively high levels of cannabidiol are needed to be effective for this use, which are difficult to obtain given the generally poor bioavailability of the compound.

Cannabinoid-infused powders comprising a cannabinoid (e.g., CBD, CBG, CBN, or mixtures thereof), an edible carrier, and an edible oil comprising long chain fatty acids, together with their preparation, are described in U.S. Ser. No. 10/756,180B2, the contents of which are incorporated herein by reference.

There is a need for improved formulations and methods of delivering cannabinoids, e.g., CBD, to enhance bioavailability and delivery to relevant sites of action.

SUMMARY

It is surprisingly discovered that cannabinoid-infused powders comprising a cannabinoid (e.g., CBD, CBG, CBN, or combinations thereof), an edible carrier, and an edible oil comprising long chain triglycerides, e.g., as described in U.S. Ser. No. 10/756,180B2 and related applications, are absorbed largely via the lymphatic system, allowing for enhanced bioavailability, enhanced distribution to the central nervous system, reduced first-pass effect and metabolism in the liver, reduced food effect, and reduced binding to plasma proteins, relative to formulations that are absorbed into the blood.

In one aspect, the present disclosure provides a method of treating a condition selected from pain, anxiety, nausea, insomnia, and dysphoria by delivery of a cannabinoid to the lymphatic system, comprising orally administering an effective amount of a pharmaceutical composition comprising a cannabinoid-infused powder as described herein to a patient in need thereof.

In another aspect, the disclosure provides a method of relieving pain in a patient in need thereof, by delivery of a cannabinoid to the lymphatic system, comprising orally administering an effective amount of a pharmaceutical composition comprising orally administering a cannabinoid-infused powder as described herein, and co-administering an opioid, either separately or as a combined formulation, to a patient in need thereof, wherein the coadministration of the cannabinoid, e.g., CBD, lowers the dose of opioid effective to relieve pain.

In another aspect, the disclosure provides methods of enhancing the lymphatic absorption of a cannabinoid API, e.g., CBD or a mixture of CBD, CBG, and CBN, comprising administering a cannabinoid-infused powder, as described herein.

In another aspect, the disclosure provides cannabinoid-infused powders comprising a cannabinoid, an edible carrier, and an edible oil comprising long chain triglycerides, wherein the cannabinoid comprises (i) CBD and CBG in a weight ratio of 5-25:1 of CBD:CBG; e.g., about 10:1 CBD:CBG or about 25:2 CBD:CBG; (ii) CBD and CBN in a weight ratio of 5-25:1 of CBD:CBN; e.g., about 20:1 CBD:CBN or about 27:2 CBD:CBN; or (iii) CBD, CBG and CBN in a weight ratio of 1-10:1-10:1-10 (CBD:CBG:CBN).

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DRAWINGS

FIG. 1 depicts the pharmacokinetics of a powdered formulation of CBD comprising long chain triglycerides (Formulation D of Example 1) vs. a medium chain triglyceride oil tincture of CBD (MedTerra).

DETAILED DESCRIPTION

Cannabidiol is water insoluble and has low oral bioavailability. The oral bioavailability of CBD is affected by the first pass effect which is a phenomenon of drug metabolism whereby the concentration of a drug, specifically when administered orally, is greatly reduced before it reaches the systemic circulation. When CBD is taken orally, it is absorbed by the digestive system and enters the hepatic portal system. It is carried through the portal vein into the liver before it reaches the rest of the body. CBD undergoes extensive first pass metabolism and its metabolites are mostly excreted via the bile with a smaller proportion excreted through the kidneys.

The hepatic first-pass metabolism of CBD can be evaded to some extent by lymphatic transport pathway, which is a pathway through which lipids and lipophilic drugs are transported into systemic circulation. In the intestine, lipids are broken into their fatty acid and glycerol components and absorbed into the intestinal enterocyte, where they are reconstructed into triglycerides for packaging into chylomicrons. Chylomicrons are lipoprotein particles that consist of triglycerides, phospholipids, cholesterol, specific proteins and lipid soluble drugs if they are present. The chylomicron-associated lipids/drugs are then transported from the enterocyte into the lymphatic circulation, rather than the portal circulation, thus avoiding the first-pass metabolism in the liver. Shifting CBD absorption from the blood to the lymphatic system also facilitates transport of the drug to the brain, reduces food effects (i.e., variable absorption due to the contents of the GI tract), and potentially provides a better route of distribution and protection from metabolism than drug bound to albumin and other plasma proteins.

While the foregoing discussion focuses on CBD, other cannabinoids are subject to similar considerations and so can be advantageously administered in formulations as described herein, e.g., to enhance bioavailability, reduce first-pass metabolism, and improve delivery to the central nervous system.

It has been found that administration of a cannabinoid-infused powder, comprising cannabinoid (e.g. CBD, CBG, CBN, or combinations thereof), an edible oil comprising long chain triglycerides, and an edible carrier, provides an unexpectedly high delivery of the cannabinoid to the lymphatic system. Without being bound to any theory, it is believed that the use of long-chain triglycerides, which require chylomicron formation to enter the body, in contrast to short and medium-chain triglycerides or no fats, provide lipid soluble drugs such as CBD, CBG, CBN, or combinations thereof with an alternative, preferable pathway to portal vein absorption.

Many phytocannabinoids act as reuptake inhibitors which allow endogenous cannabinoids to persist longer. While THC binds directly to the cannabinoid receptors, primarily CB1, the minor cannabinoids, including CBD, seem to be important for reuptake inhibition. A WHO assessment shows that CBD has low affinity to CB1 and CB2 but promotes activity of endocannabinoids. Paracetamol is also associated with endocannabinoid effects (FAAH receptors), although the details are not well-understood. There is also interaction between the cannabinoid system and the opiate system, so these cannabinoids may potentiate action of opioids, allowing for lower dose and reduced risk of addition.

The disclosure thus provides a method of relieving pain in a patient in need thereof, comprising administering an effective amount of a pharmaceutical composition comprising a cannabinoid-infused powder as described herein, e.g., any of Compositions 1 et seq. in combination with opioid, wherein the coadministration of cannabidiol lowers the dose of opioid required to relieve pain.

In other embodiments, the disclosure provides a method of treating a condition selected from pain, anxiety, nausea, dysphoria, insomnia, neuroinflammation, spasms, epilepsy, inflammation, Alzheimer's Disease, Amyotrophic Lateral Sclerosis (ALS), chronic pain, Diabetes Mellitus, dystonia, epilepsy, fibromyalgia, gastrointestinal disorders, gliomas/cancer, Hepatitis C, Human Immunodeficiency Virus (HIV), Huntington Disease, Hypertension, Incontinence, Methicillin-resistant *Staphyloccus aureus* (MRSA), Multiple Sclerosis, osteoporosis, pruritus, rheumatoid arthritis, sleep apnea, Parkinson's disease, chronic inflammation, chronic pain, cancer, nausea, vomiting, obesity, epilepsy, glaucoma, asthma, mood disorders, and Tourette Syndrome, comprising administering an effective amount of a pharmaceutical composition comprising a cannabinoid-infused powder as described herein, e.g., any of Compositions 1 et seq. to a patient in need thereof.

For example, the disclosure provides a method of treating a condition selected from pain, anxiety, nausea, insomnia, and dysphoria comprising administering an effective amount of a pharmaceutical composition comprising a cannabinoid-infused powder as described herein, e.g., any of Compositions 1 et seq. to a patient in need thereof.

The pharmaceutical composition comprising a cannabinoid-infused powder as described herein, e.g., any of Compositions 1 et seq., as described herein comprises an edible oil comprising long chain triglycerides. Long chain triglycerides are triglycerides of long chain fatty acids, e.g., fatty acids having from $C_{13}$ to $C_{24}$ carbon atoms, for example triglycerides of $C_{16}$ fatty acids, $C_{18}$ fatty acids, and mixtures thereof. The fatty acid may be saturated or unsaturated. For example, the edible oil comprising long chain triglycerides may be selected from vegetable, nut, or seed oils (such as coconut oil, peanut oil, soybean oil, safflower seed oil, corn oil, olive oil, castor oil, cottonseed oil, *arachis* oil, sunflower seed oil, coconut oil, palm oil, rapeseed oil, evening primrose oil, grape seed oil, wheat germ oil, sesame oil, avocado oil, almond oil, borage oil, peppermint oil, apricot kernel oil, and/or hemp oil) and animal oils (such as fish liver oil, shark oil and/or mink oil), and mixtures thereof. In some embodiments, the cannabinoid infused powder may further comprise medium chain triglycerides, mono- or di-glycerides, and poly-ethoxylated derivatives of glycerides, e.g., the cannabinoid infused powder may comprise components selected from sesame oil, anise oil, apricot kernel oil, apricot kernel oil PEG-6 esters, borage oil, canola oil, castor oil, castor oil polyoxyl 35, castor oil polyoxyl 40, castor oil polyoxyl 40 hydrogenated, castor oil polyoxyl 60, castor oil polyoxyl 60 hydrogenated castor oil hydrogenated, cinnamon oil, clove oil, coconut oil, coconut oil-lecithin, coconut oil fractioned, coriander oil, corn oil, corn oil PEG-6 esters (Labrafil® M 2125 CS; PEG-6-glyceryl linoleate), corn oil PEG-8 esters, cottonseed oil, cottonseed oil hydrogenated, kernel oil, kernel oil PEG-6 esters, lemon oil, mineral oil, mineral oil (light), neutral oil, nutmeg oil, olive oil, olive oil PEG-6 esters, orange oil, palm kernel oil, palm kernel oil/hydrogenated, palm kernel oil PEG-6 esters, peanut oil, peanut oil PEG-6 esters, peppermint oil, poppy seed oil, safflower oil, sunflower oil, soybean oil, soybean oil hydrogenated, soybean oil refined, triisostearin PEG-6 esters, vegetable oil, vegetable oil hydrogenated, vegetable oils glyceride hydrogenated, vegetable oil PEG esters, triolein, trilinolein, trilinolenin, glycerol esters of saturated C8-C18 fatty acids (Gelucire® 33/01), glyceryl esters of saturated C12-C18 fatty acids (Gelucire® 39/01 and 43/01), glyceryl behenate, glyceryl distearate, glyceryl isostearate, glyceryl laurate, glyceryl laurate/PEG-32 laurate (Gelucire® 44/14), glyceryl monooleate (Peceol®), glyceryl monolinoleate (Maisine® CC; also known as corn oil mono-, di-, and triglycerides), glyceryl mono and dicaprylocaprate (Masester E8120), glyceryl palmitate, glyceryl palmitostearate, glyceryl palmitostearate/PEG-32 (Gelucire® 50/13) palmitostearate glyceryl ricinoleate, glyceryl stearate, glyceryl stearate/PEG stearate, glyceryl stearate/PEG-32 stearate (Gelucire® 53/10), glyceryl stearate/PEG-40 stearate, glyceryl stearate/PEG-75 stearate, glyceryl stearate/PEG-100 stearate, polyglyceryl 10-oleate, polyglyceryl 3-oleate, polyglyceryl 4-oleate, polyglyceryl 10-tetralinoleate, polyoxyl 100 glyceryl stearate, and saturated polyglycolized glycerides (Gelucire® 37/02 and Gelucire® 50/02), caprylic/capric glycerides, caprylic/capric glycerides derived from coconut oil or palm seed oil (e.g. Labrafac®, Miglyol® 810, 812, Crodamol GTCC-PN, Softison® 378), propylene glycol caprylate/caprate (Labrafac® PC), propylene glycol dicaprylate/dicaprate (Miglyol® 840), medium chain (C8/C10) mono- and diglycerides (Capmul® MCM, Capmul® MCM (L)), and glycerol esters of saturated C8-C18 fatty acids (Gelucire® 33/01), and mixtures thereof.

In particular embodiments, the edible oil comprising long chain triglycerides is substantially free of short- or medium-chain triglycerides, e.g., wherein the fatty acid content of the edible oil comprising long chain triglycerides consists of at least 95%, e.g., at least 98%, $C_{16}$ and/or $C_{18}$ fatty acids.

The pharmaceutical compositions of the present invention comprising cannabinoid infused powder may further comprise one or more surfactants, either as part of the cannabinoid infused powder, or in addition to the cannabinoid infused powder, e.g., in an amount of 15-70% by weight of the composition, e.g., in an amount of 20-65% by weight of the composition. Surfactants have a property referred to as hydrophilic-lipophilic balance (HLB), which is a measure of how hydrophilic or lipophilic a given surfactant, or surfactant blend is. The HLB of surfactants generally ranges from 0 to 20, with 0 being the most lipophilic and 20 being the most hydrophilic. Surfactants used to produce oil-in-water emulsions often fall within the range of about 8 to 16 on the HLB scale. In some embodiments, the total surfactants in the composition have an overall HLB of about 12 or higher, which assists in formation of small droplets. Non-ionic surfactants are preferred, as these are generally less toxic than ionic surfactants. For example, the surfactants may be selected from polysorbate 20 (Tween® 20), polysorbate 80 (Tween® 80), polyethyleneglycol 660 12-hydroxystearate (Solutol® HS-15), TPGS (d-α-tocopheryl polyethylene glycol 1000 succinate), sorbitan monolaurate, sorbitan monopalmitate, sorbitan monooleate (Span® 20), sorbitan monostearate and sorbitan tristearate, polyoxyethylene-polyoxypropylene block copolymers, e.g., Poloxamer 338, Poloxamer 407, Poloxamer, 237, Poloxamer, 217, Poloxamer 124, Poloxamer 184, Poloxamer 185, almond oil PEG-6 esters, almond oil PEG-60 esters, apricot kernel oil PEG-6 esters (Labrafil® M1944CS), caprylic/capric triglycerides PEG-4 esters (Labrafac® Hydro WL 1219), caprylic/capric triglycerides PEG-4 complex (Labrafac® Hydrophile), caprylic/capric glycerides PEG-6 esters (Softigen® 767), caprylic/capric glycerides PEG-8 esters (Labrasol®), castor oil PEG-50 esters, hydrogenated castor oil PEG-5 esters, hydrogenated castor oil PEG-7 esters, 9 hydrogenated castor oil PEG-9 esters, corn oil PEG-6 esters (Labrafil® M 2125 CS; PEG-6-glyceryl linoleate), corn oil PEG-8 esters (Labrafil® WL 2609 BS), corn glycerides PEG-60 esters, olive oil PEG-6 esters (Labrafil® M1980 CS), hydrogenated palm/palm kernel oil PEG-6 esters (Labrafil® M 2130 BS), hydrogenated palm/palm kernel oil PEG-6 esters with palm kernel oil, PEG-6, palm oil (Labrafil® M 2130 CS), palm kernel oil PEG-40 esters, peanut oil PEG-6 esters (Labrafil® M 1969 CS), glycerol esters of saturated C8-C18 fatty acids (Gelucire® 33/01), glyceryl esters of saturated C12-C18 fatty acids (Gelucire® 39/01 and 43/01), glyceryl laurate/PEG-32 laurate (Gelucire® 44/14), glyceryl laurate glyceryl/PEG 20 laurate, glyceryl laurate glyceryl/PEG 32 laurate, glyceryl, laurate glyceryl/PEG 40 laurate, glyceryl oleate/PEG-20 glyceryl, glyceryl oleate/PEG-30 oleate, glyceryl palmitostearate/PEG-32 palmitostearate (Gelucire® 50/13), glyceryl stearate/PEG stearate, glyceryl stearate/PEG-32 stearate (Gelucire® 53/10), saturated polyglycolized glycerides (Gelucire® 37/02 and Gelucire® 50/02), triisostearin PEG-6 esters (i.e. Labrafil® Isostearique), triolein PEG-6 esters, trioleate PEG-25 esters, polyoxyl 35 castor oil (Cremophor® EL), polyoxyl 40 hydrogenated castor oil (Cremophor® RH 40), polyoxyl 60 hydrogenated castor oil (Cremophor® RH60), PEG-8 caproate, PEG-8 caprylate, PEG-8 caprate PEG-8 laurate, PEG-8 oleate, PEG-8 stearate, PEG-9 caproate, PEG-9 caprylate, PEG-9 caprate PEG-9 laurate, PEG-9 oleate, PEG-9 stearate, PEG-10 caproate, PEG-10 caprylate, PEG-10 caprate PEG-10 laurate, PEG-10 oleate, PEG-10 stearate, PEG-10 laurate, PEG-12 oleate, PEG-15 oleate, PEG-20 laurate, PEG-20 oleate, caprylate/caprate diglycerides, glyceryl monooleate, glyceryl ricinoleate, glyceryl laurate, glyceryl dilaurate, glyceryl dioleate, glyceryl mono/dioleate, glyceryl caprylate/caprate, medium chain (C8/C10) mono- and diglycerides (Capmul® MCM, Capmul® MCM (L)), mono- and diacetylated monoglycerides, polyglyceryl oleate, polyglyceryl-2 dioleate, polyglyceryl-10 trioleate, polyglyceryl-10 laurate, polyglyceryl-10 oleate, and polyglyceryl-10 mono dioleate, propylene glycol caprylate/caprate (Labrafac® PC), propylene glycol dicaprylate/dicaprate (Miglyol® 840), propylene glycol monolaurate, propylene glycol ricinoleate, propylene glycol monooleate, propylene glycol dicaprylate/dicaprate, propylene glycol dioctanoate, PEG-20 sorbitan monolaurate, PEG-20 sorbitan monopalmitate, PEG-20 sorbitan monostearate, and PEG-20 sorbitan monooleate, and mixtures thereof. In some embodiments, the one or more surfactants may comprise polysorbate 80, or polysorbate 80 and polyoxyl 35 castor oil (Cremophor® EL).

In some embodiments, the pharmaceutical composition is substantially surfactant-free, e.g., wherein the pharmaceutical composition contains less than 1% of surfactants (other than impurities derived from the edible oil comprising long chain triglycerides, such as long chain fatty acids or mono or di-glycerides of long chain fatty acids).

In some embodiments, the inclusion of one or more non-polar antioxidants in the pharmaceutical composition, either as part of the cannabinoid infused powder, or in addition to the cannabinoid infused powder, may be beneficial to slow or halt the degradation of the non-polar active ingredient(s). These oil-soluble antioxidants are ideally selected from mixed tocopherols, quercetin, curcumin or other suitable oil-soluble antioxidants, with the ability to slow or halt the degradation of the non-polar active ingredient(s).

In some embodiments, the addition of anti-bacterial and/or anti-fungal agents to the pharmaceutical composition, either as part of the cannabinoid infused powder, or in addition to the cannabinoid infused powder, may be beneficial. These anti-bacterial and/or anti-fungal agents may be, for example, non-polar, natural anti-bacterial and/or anti-fungal agents selected from among thymol, carvacrol, lauric acid, or other naturally occurring anti-bacterial and/or anti-fungal agents.

The disclosure thus provides a method (Method 1) of
- a. treating a condition responsive to cannabinoid therapy, e.g. selected from pain, anxiety, nausea, insomnia, and dysphoria, by delivery of a cannabinoid to the lymphatic system, or
- b. enhancing delivery of a cannabinoid, e.g., CBD, CBG, and/or CBN, to the lymphatic system; or
- c. enhancing delivery of a cannabinoid, e.g., CBD, CBG, and/or CBN, to the central nervous system; or
- d. reducing first pass metabolism of a cannabinoid, e.g., CBD, CBG, and/or CBN; or
- e. reducing food effects in administration of a cannabinoid, e.g., CBD, CBG, and/or CBN;
- f. reducing the dose of opiate needed to relieve pain in a patient receiving opioid treatment; or
- g. treating, mitigating, or inhibiting a condition responsive to CBD, e.g., a viral infection, e.g. a SARS-CoV-2 infection;

comprising orally administering to a patient in need thereof, an effective amount of a pharmaceutical composition comprising a cannabinoid-infused powder, wherein the cannabinoid-infused powder comprises a cannabinoid active pharmaceutical ingredient (API) (e.g. CBD, CBG, CBN, or combinations thereof), an edible oil comprising long chain triglycerides, and an edible carrier.

For example, in particular embodiments the disclosure provides:

1.1. Method 1, wherein the active pharmaceutical ingredient (API) is free or substantially free of delta-9-tetrahydrocannabinol (THC).
1.2. Method 1 or 1.1 wherein the API contains less than 0.03%, less than 0.01%, less than 0.001%, less than 0.0001%, or less than 0.00001% THC by weight of delta-9-tetrahydrocannabinol (THC).
1.3. Any foregoing Method, wherein the API is a CBD-rich hemp extract.
1.4. Any foregoing Method, wherein the API is a CBD-rich cold distillate of *Cannabis* plant material, e.g., comprising greater than 90% of cannabinoids and less than 10% of other materials from the plant.
1.5. Any foregoing Method, wherein the API comprises CBD.
1.6. Any foregoing Method wherein the API comprises CBG.
1.7. Any foregoing Method wherein the API comprises CBN.
1.8. Any foregoing Method wherein the API comprises CBD and CBG.
1.9. Any foregoing Method wherein the API comprises CBD and CBN.
1.10. Any foregoing Method wherein the API comprises CBD, CBG and CBN.
1.11. Any foregoing Method wherein the API comprises CBD and CBG in a weight ratio of 5-25:1 of CBD:CBG; e.g., about 10:1 CBD:CBG or about 25:2 CBD:CBG.
1.12. Any foregoing Method wherein the API comprises CBD and CBG in a weight ratio of 5-25:1 of CBD:CBN; e.g., about 20:1 CBD:CBN or about 27:2 CBD:CBN.
1.13. Any foregoing Method wherein the API comprises CBD, CBG and CBN in a weight ratio of 5-25:1-5:1-5 (CBD:CBG:CBN).
1.14. Any foregoing Method, wherein the cannabinoid present in the API comprises a synthetic cannabidiol.
1.15. Any foregoing Method, wherein the API consists of cannabinoids selected from CBD, CBG, CBN, and mixtures thereof, e.g., wherein the API is substantially free of THC, e.g., wherein the API is substantially free of cannabinoids other than CBD, CBG, CBN, and mixtures thereof, e.g., wherein the API contains less than 0.1% of THC, e.g., wherein the API contains less than 0.1% of cannabinoids other than CBD, CBG, CBN, and mixtures thereof.
1.16. Any foregoing Method, wherein the API consists of CBD, CBG, and CBN, e.g., is substantially free of other cannabinoids, e.g., contains less than 0.1% of other cannabinoids.
1.17. Any foregoing Method, wherein the API is present in an amount of 2-15%, 5-15%, 2-10%, 5-10%, 10-15%, 8-12%, about 6%, about 7%, or about 8% by weight of the pharmaceutical composition.
1.18. Any foregoing Method wherein the API is supplied in a hemp distillate comprising CBD and CBG and/or CBN and substantially free of THC, e.g. less than 0.1% THC.
1.19. Any foregoing Method wherein the pharmaceutical composition is in unit dose form, e.g., capsule form.
1.20. Any foregoing Method wherein the pharmaceutical composition is in capsule form, wherein each capsule comprises 20-30 mg CBD and 1-3 mg CBG and/or CBN.
1.21. Any foregoing Method, wherein the edible oil comprising long chain triglycerides is selected from vegetable, nut, or seed oils (such as coconut oil, peanut oil, soybean oil, safflower seed oil, corn oil, olive oil, castor oil, cottonseed oil, *arachis* oil, sunflower seed oil, coconut oil, palm oil, rapeseed oil, evening primrose oil, grape seed oil, wheat germ oil, sesame oil, avocado oil, almond oil, borage oil, peppermint oil, apricot kernel oil, and/or hemp oil) and animal oils (such as fish liver oil, shark oil and/or mink oil), and mixtures thereof.
1.22. Any foregoing Method, wherein the edible oil comprising long chain triglycerides comprises sunflower seed oil.
1.23. Any foregoing Method, wherein the edible oil comprising long chain triglycerides comprises hemp oil.
1.24. Any foregoing Method, wherein the edible oil comprising long chain triglycerides comprises a mixture of sunflower seed oil and hemp oil.
1.25. Any foregoing Method, wherein the edible oil comprising long chain triglycerides is substantially free of short- or medium-chain triglycerides, e.g., wherein the fatty acid content of the edible oil comprising long chain triglycerides consists of at least 95%, e.g., at least 98%, $C_{16}$ and/or $C_{18}$ fatty acids.
1.26. Any foregoing method wherein the fatty acids in the edible oil comprising ling chain triglycerides comprise a mixture of palmitic acid, stearic acid, oleic acid, and linoleic acid.

1.27. Any foregoing method wherein the fatty acids in the edible oil comprising ling chain triglycerides comprise at least 60%, e.g., at least 80%, of a mixture of oleic acid and linoleic acid.

1.28. Any foregoing Method, wherein the edible carrier comprises one or more substances selected from dried plant material (e.g., tea leaves, coffee beans, cocoa powder, gingko balboa powder, and/or *ginseng* powder), milk powder, starch (e.g., tapioca starch), silicon dioxide, and mixtures thereof.

1.29. Any foregoing Method, wherein the edible carrier comprises tapioca starch and silicon dioxide.

1.30. Any foregoing Method, wherein the edible carrier comprises tapioca starch, silicon dioxide, gingko balboa powder, and *ginseng* powder.

1.31. Any foregoing Method wherein the pharmaceutical composition further comprises melatonin.

1.32. Any foregoing method wherein
  the API comprises (a) 4%-6% CBD and (b) 0.2% to 0.7% CBG and/or 0.2% to 0.7% CBN, by weight of the cannabinoid-infused powder;
  the edible oil comprises 5-10% sunflower seed oil, by weight of the cannabinoid-infused powder; and
  the edible carrier is selected from silicon dioxide, starch, e.g tapioca starch, dried plant material (e.g., *ginseng* powder and gingko balboa powder), and mixtures thereof, and comprises 80%-90% by weight of the cannabinoid infused powder.

1.33. Any foregoing Method wherein the cannabinoid-infused powder is obtained or obtainable by contacting the edible carrier with an edible oil comprising the cannabinoid active pharmaceutical ingredient and a second edible oil, and drying and pulverizing the infused edible carrier thus obtained.

1.34. Any foregoing Method wherein, after oral administration, at least 40%, e.g., at least 50%, e.g., at least 60%, of the API absorbed is absorbed via the lymphatic system rather than the portal vein absorption, e.g., as measured in rats with cannulated intestinal lymph duct and portal veins, e.g., as described in Example 2.

1.35. Any foregoing Method wherein the liver metabolism of the API within one hour of oral administration is reduced relative to the liver metabolism of the API within one hour of oral administration of a formulation that does not comprise long chain triglycerides.

1.36. Any foregoing Method wherein, after oral administration, the total bioavailability of the API is at least 70%, e.g., at least 80%, e.g., at least 90%.

1.37. Any foregoing Method wherein the bioavailability after oral administration is substantially the same, e.g., ±10%, in fed and fasted subjects.

1.38. Any foregoing Method wherein, after oral administration, the API is present in the cerebrospinal fluid (CSF) at levels greater than the levels in the plasma.

1.39. Any foregoing Method wherein the cannabinoid-infused powder is provided in a unit dose form, e.g., in a capsule or tablet.

1.40. Any foregoing Method wherein the cannabinoid-infused powder is provided in a unit dose form, e.g., in a capsule or tablet, comprising API in the amount of 20-100 mg.

1.41. Any foregoing Method wherein the cannabinoid-infused powder is provided in a unit dose form, e.g., in a capsule or tablet, wherein the API comprises 10-50 mg CBD.

1.42. Any foregoing Method wherein the cannabinoid-infused powder is provided in a unit dose form, e.g., in a capsule or tablet, wherein the API comprises 10-50 mg CBD and 1-5 mg CBG.

1.43. Any foregoing Method wherein the cannabinoid-infused powder is provided in a unit dose form, e.g., in a capsule or tablet, wherein the API comprises 10-50 mg CBD and 1-5 mg CBN.

1.44. Any foregoing Method wherein the cannabinoid-infused powder is provided in a unit dose form, e.g., in a capsule or tablet, wherein the API comprises 10-50 mg CBD, 1-5 mg CBG, and 1-5 mg CBN.

1.45. Any foregoing Method wherein the API is administered in a daily dose of 20-100 mg of cannabinoid, e.g., wherein the API is administered in a daily dose comprising 10-50 mg CBD; or 10-50 mg CBD and 1-5 mg CBG; or 10-50 mg CBD and 1-5 mg CBN; or 10-50 mg CBD, 1-5 mg CBG, and 1-5 mg CBN.

1.46. Any foregoing Method which is a method of treating a condition responsive to cannabinoid therapy, by delivery of a cannabinoid to the lymphatic system, wherein the condition is selected from pain, anxiety, nausea, dysphoria, insomnia, neuroinflammation, spasms, epilepsy, inflammation, Alzheimer's Disease, Amyotrophic Lateral Sclerosis (ALS), chronic pain, Diabetes Mellitus, dystonia, epilepsy, fibromyalgia, gastrointestinal disorders, gliomas/cancer, Hepatitis C, Human Immunodeficiency Virus (HIV), Huntington Disease, Hypertension, Incontinence, Methicillin-resistant *Staphyloccus aureus* (MRSA), Multiple Sclerosis, osteoporosis, pruritus, rheumatoid arthritis, sleep apnea, Parkinson's disease, chronic inflammation, chronic pain, cancer, nausea, vomiting, obesity, epilepsy, glaucoma, asthma, mood disorders, and Tourette Syndrome.

1.47. Any foregoing Method which is a method of treating a condition selected from pain, anxiety, nausea, insomnia, and dysphoria by delivery of a cannabinoid to the lymphatic system.

1.48. Any foregoing Method which is a method of enhancing delivery of a cannabinoid, e.g., CBD, CBG, and/or CBN, to the lymphatic system.

1.49. Any foregoing Method which is a method of enhancing delivery of a cannabinoid, e.g., CBD, CBG, and/or CBN, to the central nervous system.

1.50. Any foregoing Method which is a method of reducing first pass metabolism of a cannabinoid, e.g., CBD, CBG, and/or CBN.

1.51. Any foregoing Method which is a method of reducing food effects in administration of a cannabinoid, e.g., CBD, CBG, and/or CBN.

1.52. Any foregoing Method which is a method of reducing the dose of opiate needed to relieve pain in a patient receiving opioid treatment.

1.53. Any foregoing Method which is a method of relieving pain in a patient in need thereof, by delivery of a cannabinoid to the lymphatic system, comprising orally administering an effective amount of a pharmaceutical composition comprising a cannabinoid-infused powder in accordance with any foregoing Method, and further comprising co-administering an opioid, either separately or as a combined formulation, to the patient in need thereof, wherein the coadministration of the cannabinoid-infused powder lowers the dose of opioid effective to relieve pain.

1.54. Any foregoing Method which is a method of treating, inhibiting or mitigating a SARS-CoV-2 infection, e.g. by delivering an amount of CBD effective to inhibit SARS-CoV-2 replication through induction of host ER stress and innate immune responses.

1.55. Any foregoing Method wherein the pharmaceutical composition is a composition according to any of Compositions 1, et seq. below.

The cannabinoid-infused powders for use in the methods of the disclosure may contain an active pharmaceutical ingredient (API) containing cannabidiol (CBD), e.g., a mixture of CBD, CBG and CBN. In certain embodiments, the active pharmaceutical ingredient (API) is free or substantially free of delta-9-tetrahydrocannabinol (THC), e.g. contains less than 0.03%, less than 0.01%, less than 0.001%, less than 0.0001%, or less than 0.00001% THC by weight of the API. In some embodiments, the API is a CBD-rich hemp extract. As used herein, the term "hemp" refers to *cannabis* that contains 0.3% or less THC by dry weight. The CBD-rich hemp extract may be prepared by any method known in the art. For example, cannabinoids may be extracted from dried hemp leaves of the three species *Cannabis sativa, Cannabis indica*, and *Cannabis ruderalis* using a hydrocarbon solvent such as butane, a supercritical solvent such as carbon dioxide, or ethanol. The hemp extracts may be processed to remove THC and enrich CBD by purification steps such as column chromatography. The API may comprise other cannabidiols such as cannabigerol (CBG) and/or cannabinol (CBN). In some embodiments, the API comprises CBD, CBG and CBN, optionally wherein the CBD, CBG and CBN are present in a weight ratio of 1-10:1-10:1-10 (CBD:CBG:CBN). In other embodiments, the cannabidiol present in the API may be a synthetic cannabidiol. As used herein, the term "synthetic cannabidiol" refers to cannabidiol that is manufactured using chemical means rather than obtained from hemp plant. Cannabidiol may be manufactured by any method known in the art. In some embodiments, the API does not contain any cannabinoid other than CBD. In other embodiments, the API comprises other cannabidiols such as cannabigerol (CBG) and cannabinol (CBN). In some embodiments, the API comprises CBD, CBG and CBN, optionally wherein the CBD, CBG and CBN are present in a weight ratio of 1-10:1-10:1-10 (CBD:CBG:CBN).

For example, the API may be present in an amount of 1-15% by weight of the composition. In some embodiments, the API is present in an amount of 2-15%, 5-15%, 2-10%, 5-10%, 10-15%, 8-12%, or about 10% by weight of the composition.

For example, the disclosure further provides a pharmaceutical composition (Composition 1) comprising a cannabinoid-infused powder comprising a cannabinoid active pharmaceutical ingredient (API)(e.g. CBD, CBG, CBN, or combinations thereof), an edible carrier, and an edible oil comprising long chain triglycerides.

1.1. Composition 1, wherein the cannabinoid-infused powder is provided in a unit dose form, e.g., in a capsule or tablet, wherein the API comprises 10-50 mg CBD.

1.2. Any foregoing Composition wherein, wherein the cannabinoid API comprises
- (i) CBD and CBG in a weight ratio of 5-20:1 of CBD:CBG; e.g., about 10:1 CBD:CBG or about 25:2 CBD:CBG;
- (ii) CBD and CBN in a weight ratio of 5-20:1 of CBD:CBN; e.g., about 10:1 CBD:CBN or about 27:2 CBD:CBN; or
- (iii) CBD, CBG and CBN in a weight ratio of 1-10:1-10:1-10 (CBD:CBG:CBN); e.g., 1.3. Any foregoing Composition wherein the cannabinoid-infused powder is provided in a unit dose form, e.g., in a capsule or tablet, wherein the API comprises 10-50 mg CBD and 1-5 mg CBG.

1.4. Any foregoing Composition wherein the cannabinoid-infused powder is provided in a unit dose form, e.g., in a capsule or tablet, wherein the API comprises 10-50 mg CBD and 1-5 mg CBN.

1.5. Any foregoing Composition wherein the cannabinoid-infused powder is provided in a unit dose form, e.g., in a capsule or tablet, wherein the API comprises 10-50 mg CBD, 1-5 mg CBG, and 1-5 mg CBN.

1.6. Any foregoing Composition, wherein the cannabinoid present in the API comprises a synthetic cannabidiol.

1.7. Any foregoing Composition, wherein the API consists of cannabinoids selected from CBD, CBG, CBN, and mixtures thereof, e.g., wherein the API is substantially free of THC, e.g., wherein the API is substantially free of cannabinoids other than CBD, CBG, CBN, and mixtures thereof, e.g., wherein the API contains less than 0.1% of THC, e.g., wherein the API contains less than 0.1% of cannabinoids other than CBD, CBG, CBN, and mixtures thereof.

1.8. Any foregoing Composition, wherein the API consists of CBD, CBG, and CBN, e.g., is substantially free of other cannabinoids, e.g., contains less than 0.1% of other cannabinoids.

1.9. Any foregoing Composition, wherein the API is present in an amount of 2-15%, 5-15%, 2-10%, 5-10%, 10-15%, 8-12%, or about 10% by weight of the pharmaceutical composition.

1.10. Any foregoing Composition, wherein the edible oil comprising long chain triglycerides is selected from vegetable, nut, or seed oils (such as coconut oil, peanut oil, soybean oil, safflower seed oil, corn oil, olive oil, castor oil, cottonseed oil, *arachis* oil, sunflower seed oil, coconut oil, palm oil, rapeseed oil, evening primrose oil, grape seed oil, wheat germ oil, sesame oil, avocado oil, almond oil, borage oil, peppermint oil, apricot kernel oil, and/or hemp oil) and animal oils (such as fish liver oil, shark oil and/or mink oil), and mixtures thereof.

1.56. Any foregoing Composition, wherein the edible oil comprising long chain triglycerides comprises sunflower seed oil.

1.57. Any foregoing Composition, wherein the edible oil comprising long chain triglycerides comprises hemp oil.

1.58. Any foregoing Composition, wherein the edible oil comprising long chain triglycerides comprises a mixture of sunflower seed oil and hemp oil.

1.59. Any foregoing Method, wherein the edible oil comprising long chain triglycerides is substantially free of short- or medium-chain triglycerides, e.g. wherein 95%, e.g. 98%, of the triglyceride content of the pharmaceutical composition consists of triglycerides comprising $C_{16}$ and/or $C_{18}$ fatty acids.

1.60. Any foregoing Composition wherein the fatty acids in the edible oil comprising ling chain triglycerides comprise a mixture of palmitic acid, stearic acid, oleic acid, and linoleic acid.

1.61. Any foregoing Composition wherein the fatty acids in the edible oil comprising ling chain triglycerides comprise at least 60%, e.g., at least 80%, of a mixture of oleic acid and linoleic acid.

1.62. Any foregoing Composition, wherein the edible carrier comprises one or more substances selected from dried plant material (e.g., tea leaves, coffee beans, cocoa powder, gingko balboa powder, and/or *ginseng* powder), milk powder, starch (e.g., tapioca starch), silicon dioxide, and mixtures thereof.

1.63. Any foregoing Composition, wherein the edible carrier comprises tapioca starch and silicon dioxide.

1.64. Any foregoing Composition, wherein the edible carrier comprises tapioca starch, silicon dioxide, gingko balboa powder, and *ginseng* powder.

1.65. Any foregoing Composition wherein the pharmaceutical composition further comprises melatonin.

1.66. Any foregoing Composition wherein
the API comprises 4%-6% CBD and 0.2% to 0.7% CBG or 0.2% to 0.7% CBN, by weight of the cannabinoid-infused powder;
the edible oil comprises 5-10% sunflower seed oil, by weight of the cannabinoid-infused powder; and
the edible carrier is selected from silicon dioxide, starch, e.g tapioca starch, dried plant material (e.g., *ginseng* powder and gingko balboa powder), and mixtures thereof, and comprises 80%-90% by weight of the cannabinoid infused powder.

1.67. Any foregoing Composition wherein the cannabinoid-infused powder is obtained or obtainable by contacting the edible carrier with an edible oil comprising the cannabinoid active pharmaceutical ingredient and a second edible oil, and drying and pulverizing the infused substance thus obtained.

1.68. Any previous Composition, further comprising one or more surfactants, e.g., in an amount of 20-65% by weight of the composition.

1.69. Any previous Composition, further comprising one or more surfactants, wherein the one or more surfactants have a HLB of about 8 to 16.

1.70. Any previous Composition, further comprising one or more surfactants, wherein the total surfactants in the composition have an overall HLB of about 12 or higher.

1.71. Any previous Composition, further comprising one or more surfactants, wherein the one or more surfactants are non-ionic surfactants.

1.72. Any previous Composition, further comprising one or more surfactants, wherein the one or more surfactants comprise polysorbate 80, polyoxyl 35 castor oil, or a combination thereof.

1.73. Any foregoing Composition, further comprising one or more surfactants, wherein the cannabinoid-infused powder is obtained or obtainable by contacting the edible carrier with an edible oil comprising the cannabinoid active pharmaceutical ingredient and a second edible oil, drying and pulverizing the infused substance thus obtained, and adding one or more surfactants in dry form.

1.74. Any foregoing Composition, other than Compositions 1.68-1.73, wherein the Composition is substantially surfactant-free, e.g., wherein the pharmaceutical composition contains less than 1% of surfactants (other than impurities derived from the edible oil comprising long chain triglycerides, such as long chain fatty acids or mono or di-glycerides of long chain fatty acids).

1.75. Any foregoing Composition comprising one or more antioxidants, e.g., one or more non-polar antioxidants, e.g., selected from mixed tocopherols, quercetin, curcumin or other suitable oil-soluble antioxidants, e.g., in an amount effective to slow or halt the degradation of the non-polar active ingredient(s).

1.76. Any foregoing Composition comprising one or more anti-microbial agents, e.g. anti-bacterial and/or antifungal agents, for example non-polar, natural anti-bacterial and/or anti-fungal agents, e.g., selected from among thymol, carvacrol, lauric acid, or other naturally occurring anti-bacterial and/or anti-fungal agents, e.g., in an anti-microbially effective amount, e.g., in an amount effective to kill microbes or slow or halt microbial growth, e.g. wherein the microbes are bacteria and/or fungi.

1.77. Any foregoing Composition wherein, after oral administration, at least 40%, e.g., at least 50%, e.g., at least 60%, of the API absorbed is absorbed via the lymphatic system rather than the portal vein absorption, e.g., as measured in rats with cannulated intestinal lymph duct and portal veins, e.g., as described in Example 2.

1.78. Any foregoing Composition wherein, after oral administration, the liver metabolism of the API within one hour of oral administration is reduced relative to the liver metabolism of the API within one hour of oral administration of a formulation that does not comprise long chain triglycerides.

1.79. Any foregoing Composition wherein, after oral administration, the total bioavailability of the API is at least 70%, e.g., at least 80%, e.g., at least 90%.

1.80. Any foregoing Composition wherein the bioavailability after oral administration is substantially the same, e.g., ±10%, in fed and fasted subjects.

1.81. Any foregoing Composition wherein, after oral administration, the API is present in the cerebrospinal fluid (CSF) at levels greater than the levels in the plasma.

1.82. Any foregoing Composition for use in any of Methods 1, et seq.

The disclosure further provides a pharmaceutical composition comprising a cannabinoid-infused powder, wherein the cannabinoid-infused powder comprises a cannabinoid active pharmaceutical ingredient (API)(e.g. CBD, CBG, CBN, or combinations thereof), an edible oil comprising long chain triglycerides, and an edible carrier, e.g., a pharmaceutical composition according to any of Composition 1, et seq., for use in any of Methods 1, et seq.

The disclosure further provides the use of a cannabinoid active pharmaceutical ingredient (API)(e.g. CBD, CBG, CBN, or combinations thereof) in the manufacture of a pharmaceutical composition comprising a cannabinoid-infused powder, wherein the cannabinoid-infused powder comprises a cannabinoid active pharmaceutical ingredient (API)(e.g. CBD, CBG, CBN, or combinations thereof), an edible oil comprising long chain triglycerides, and an edible carrier, e.g., a pharmaceutical composition according to any of Composition 1, et seq., for a treatment in accordance with any of Methods 1, et seq.

The foregoing pharmaceutical compositions of Composition 1, et seq. are generally prepared by mixing the ingredients, drying the mixture using dry heat, e.g., in an oven, pulverizing the dried mixture, and formulating into unit dose form, e.g., by filling capsules to provide the desired unit dose amounts. For example, the cannabinoid-infused powder may be made by contacting the edible carrier with an edible oil comprising the cannabinoid active pharmaceutical ingredient and a second edible oil, and drying and pulverizing the infused substance thus obtained. Optional ingredients such as surfactants, anti-oxidants, and/or anti-microbial agents may be added prior to the drying and pulverizing the infused substance, so as to form part of the cannabinoid-infused powder, or may be added to the cannabinoid-infused powder in formulating the pharmaceutical compositions.

Unless stated otherwise, all percentages of composition components given in this specification are by weight based on a total composition or formulation weight of 100%.

The compositions and formulations as provided herein are described and claimed with reference to their ingredients, as is usual in the art. As would be evident to one skilled in the art, the ingredients may in some instances react with one another, so that the true composition of the final formulation may not correspond exactly to the ingredients listed. Thus, it should be understood that the invention extends to the product of the combination of the listed ingredients.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

EXAMPLES

Example 1: Exemplary Formulations

Formulations A, B, C and D are prepared in the form of capsules, wherein each capsule contains:

| Ingredient (mg per capsule) | Formulation A | Formulation B | Formulation C | Formulation D |
|---|---|---|---|---|
| Silicon dioxide (mg) | 63.43 (ca. 15%) | 49.99 (ca. 12%) | 60.00 (ca. 14%) | 55.55 (ca. 11.7%) |
| Tapioca starch (mg) | 58.83 (ca. 14%) | 328.41 (ca. 77%) | 303.00 (ca. 71%) | 364.90 (ca. 76.7%) |
| Hemp distillate A (mg) | 31.71 (ca. 7.6%) | | | |
| Hemp distillate B (mg) | | 25.00 (ca. 5.8%) | | |
| Hemp distillate C (mg) | | | 30.00 (ca. 7%) | |
| Hemp distillate D (mg) | | | | 27.77 (ca. 5.8%) |
| Sunflower oil (mg) | 31.71 (ca. 7.6%) | 25.00 (ca. 5.8%) | 30.00 (ca. 7%) | 27.77 (ca. 5.8%) |
| Ginseng (mg) | 150.00 (ca. 36%) | | | |
| Ginkgo biloba (mg) | 80.00 (ca. 19%) | | | |
| Melatonin (mg) | | | | 2.50 (ca. 0.6%) |
| Total | 415.68 (100%) | 428.40 (100%) | 425.50 (100%) | 476.00 (100%) |

The hemp distillate components of the foregoing formulations are cold distillates from *Cannabis* plant material comprising >90% cannabinoids (primarily CBD, together with lesser amounts of CBG, CBN, and other cannabinoids), and <10% *Cannabis* impurities, e.g., mixed terpenes, waxes, lipids, and/or proteins. In the above formulations:
- 31.71 mg of hemp distillate A provides 25 mg CBD (6% of formulation A) and 2.1 mg CBG (0.5% of formulation A) per capsule.
- 25 mg of hemp distillate B component provides 20 mg CBD (4.7% of formulation B) and 1 mg CBN (0.23% of formulation B) per capsule.
- 30 mg of hemp distillate C component provides 27 mg CBD (6% of formulation C) and 1.9 mg CBN (0.45% of formulation C) per capsule.
- 27.77 mg of hemp distillate D component provides 20.05 mg CBD (4.2% of formulation D) per capsule.

The formulations are prepared by mixing the ingredients in the proportions described, in an amount sufficient to provide the desired number of capsules, drying the mixture in an oven, pulverizing the dried mixture, and filling hard gel capsules with the powder thus obtained, in the amounts per capsule as described above.

Example 2: Bioavailability of Test Formulations

Differences in absorption from the GI tract of rats given several different preparations of cannabidiol (CBD) are evaluated. It is believed that, with a suitable formulation, the lipophilic CBD can be preferentially directed (channeled) towards lymphatic absorption versus portal vein absorption, thus avoiding metabolism in the liver and resulting in higher systemic blood levels.

Male adult rats with cannulated intestinal lymph duct and portal vein have their samples collected after administering equidose quantities of different preparations. In order to get systemic pharmacokinetics, another set of rats with only jugular vein cannula is studied under the same conditions. In both groups of animals, a gastric infusion tube is introduced into the stomach through a fundal incision and the incision is sealed off by a purse string suture.

For Experiment 1, five days before an experiment is planned, the animal undergoes surgery for the installation of various cannulae. Under isoflurane anesthesia, the portal vein is cannulated. The animal is then allowed to recover for 3 days prior to the intestinal lymph duct cannulation. A stomach infusion tube is also installed. After overnight recovery, the lymph catheter collects chylomicrons produced and secreted by the small intestinal epithelial cells (enterocytes). The portal vein allows blood sampling when lymph samples are collected. This allows a comparison of lymphatic versus portal transport of CBD when infused with different vehicles. Rats with satisfactory catheters are used for each test article. Each rat receives an equal dose of the test article to which they have been assigned as a slow gavage five minutes. Lymph samples are sampled for 1 h before gavage and then hourly for 6 h. In certain experiments, 30 min. lymph samples are taken to present a better picture of the lymphatic transport. Other experiments to go more than 6 h to 8 h. At each hour time point of lymph collection 0.2 ml of blood is taken from the portal vein to isolate the plasma for analyses. The lymphatic flow usually varies between 2-4 ml per hour.

In Experiment 2, animals are fasted overnight prior to surgery. In the morning, under isofluorane anesthesia, the jugular vein is cannulated and the stomach is intubated as described above. A similar mixture as those tested in Experiment 1 is administered into the stomach and blood samples is collected as portal vein samples described above and the plasma is analyzed for CBD content. Jugular vein blood (0.2 ml) is taken from the rats and analyzed for CBD content.

Blood collected from the portal and jugular catheters is quickly spun and plasma is collected, frozen, and stored at −80 C. Intestinal lymph samples are frozen and stored at −80 C. Some of this lymph is fractionated into chylomicron and other fractions for CBD assay using LC-MS.

The concentrations of CBD for each animal at each interval is plotted for each animal and summarized across all animals in a cohort for mean, SD, and SEM. The portal vein vs. thoracic duct concentrations within each group are compared with a T test. The portal vein, thoracic duct and systemic values among the four groups are compared with ANOVA testing.

A CBD-infused powder (Formulation D of Example 1) shows significantly higher $C_{max}$, faster $T_{max}$, and approximately double AUC over six hours, indicating faster and greater absorption of the CBD, compared to a commercial CBD tincture comprising a medium chain triglyceride (MCT) oil and hemp extract comprising CBD (MedTerra). These data are set forth in FIG. 1 and in the following table:

| Systemic Pharmacokinetics | | | | |
| --- | --- | --- | --- | --- |
| Test formulation | N | Mean $C_{max}$ ng/mL (SD) | Mean $T_{max}$ Minutes | Mean AUC ng * hr/mL (SD) |
| Formulation D | 5 | 15.45(7.46) | 72 | 60.3(18.0) |
| MedTerra | 5 | 8.35(0.83) | 276 | 29.7(7.9)* |

The invention claimed is:

1. A method of enhancing delivery of a cannabinoid to the central nervous system; comprising orally administering to a patient in need thereof, an effective amount of a pharmaceutical composition comprising a cannabinoid-infused powder, wherein the cannabinoid-infused powder comprises a cannabinoid active pharmaceutical ingredient (API) in an amount of (a) 4%-6% CBD and (b) 0.2% to 0.7% CBG and/or 0.2% to 0.7% CBN, by weight of the cannabinoid-infused powder; an edible oil consisting of 5-10% sunflower seed oil, by weight of the cannabinoid-infused powder; and an edible carrier selected from silicon dioxide, starch, dried plant material and mixtures thereof, wherein the edible carrier comprises 80%-90% by weight of the cannabinoid infused powder, and wherein the cannabinoid-infused powder does not contain any additional oil.

2. The method of claim 1 wherein
the API comprises 5.8%, by weight of the cannabinoid-infused powder;
the edible oil consists of 5.8% sunflower seed oil, by weight of the cannabinoid-infused powder; and
the edible carrier is selected from silicon dioxide, starch, and mixtures thereof, and comprises 88.4% by weight of the cannabinoid infused powder.

3. The method of claim 1, wherein the pharmaceutical composition further comprises melatonin.

* * * * *